United States Patent [19]

Mabuchi et al.

[11] Patent Number: 4,910,613
[45] Date of Patent: Mar. 20, 1990

[54] SIGNAL REPRODUCING APPARATUS HAVING MEANS FOR INTERMITTENTLY MOVING TAPE-SHAPED RECORD BEARING MEDIUM

[75] Inventors: Toshiaki Mabuchi; Hiroo Edakubo, both of Tokyo; Nobutoshi Takayama, Kanagawa, all of Japan

[73] Assignee: Canon Kabushiki Kaisha, Tokyo, Japan

[21] Appl. No.: 263,981

[22] Filed: Oct. 27, 1988

Related U.S. Application Data

[63] Continuation of Ser. No. 779,668, Sep. 24, 1985, abandoned.

[30] Foreign Application Priority Data

Oct. 1, 1984 [JP] Japan .................................. 59-205756
Oct. 1, 1984 [JP] Japan .................................. 59-205757
Oct. 1, 1984 [JP] Japan .................................. 59-205758
Oct. 1, 1984 [JP] Japan .................................. 59-205759
Oct. 4, 1984 [JP] Japan .................................. 59-205761

[51] Int. Cl.$^4$ ..................... G11B 21/02; G11B 21/10
[52] U.S. Cl. .................................. 360/10.1; 360/10.2; 360/77.01
[58] Field of Search .................... 360/10.1, 10.2, 10.3, 360/75, 109

[56] References Cited

U.S. PATENT DOCUMENTS 4,426,665 1/1984 Bradford et al. .................. 360/10.2
4,581,658 4/1986 Azuma et al. ...................... 360/10.2
4,677,505 1/1987 Nukada et al. ......................... 360/77

Primary Examiner—Robert L. Richardson
Attorney, Agent, or Firm—Robin, Blecker, Daley & Driscoll

[57] ABSTRACT

An apparatus for reproducing an information signal from a tape-shaped record bearing medium on which many helical tracks are formed, which is so constructed that while the tape-shaped record bearing medium is intermittently moved in longitudinal direction, the moving distance during traveling of the medium is determined by using a reproduced signal from the head when the medium is stopped, whereby the precise tracking is maintained constantly during travelling.

20 Claims, 12 Drawing Sheets

FIG.2A
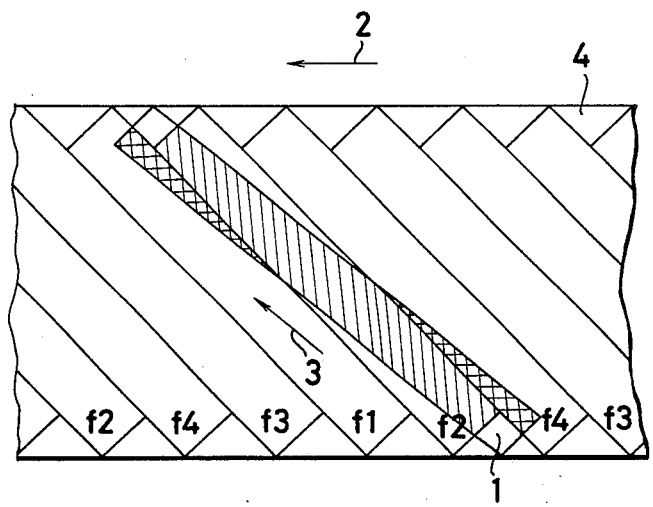
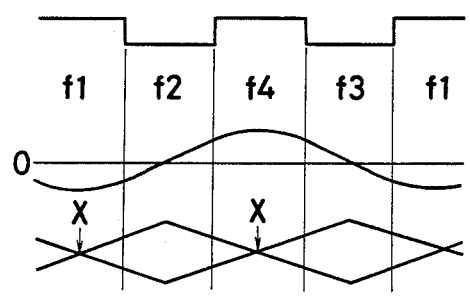
FIG.2B(a)
FIG.2B(b)
FIG.2B(c)
FIG.2B(d)

FIG.3A
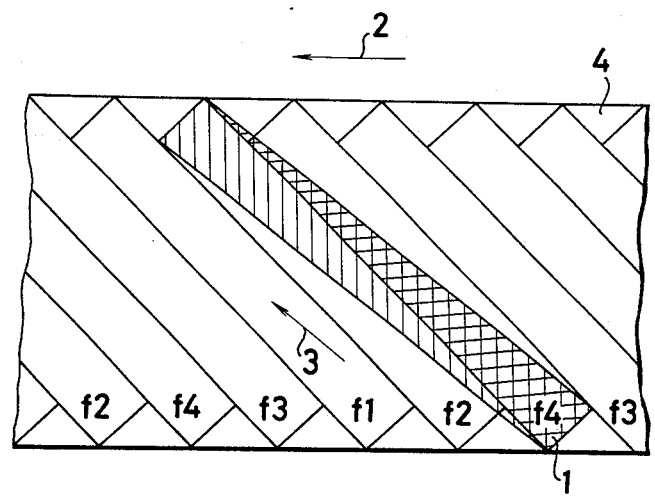
FIG.3B(a)
FIG.3B(b)
FIG.3B(c)
FIG.3B(d)
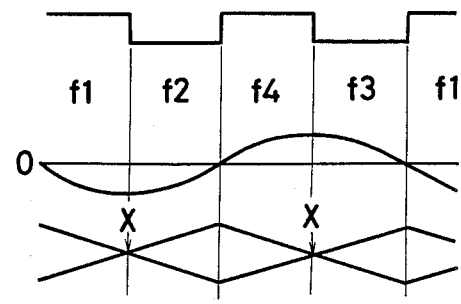

FIG.4A
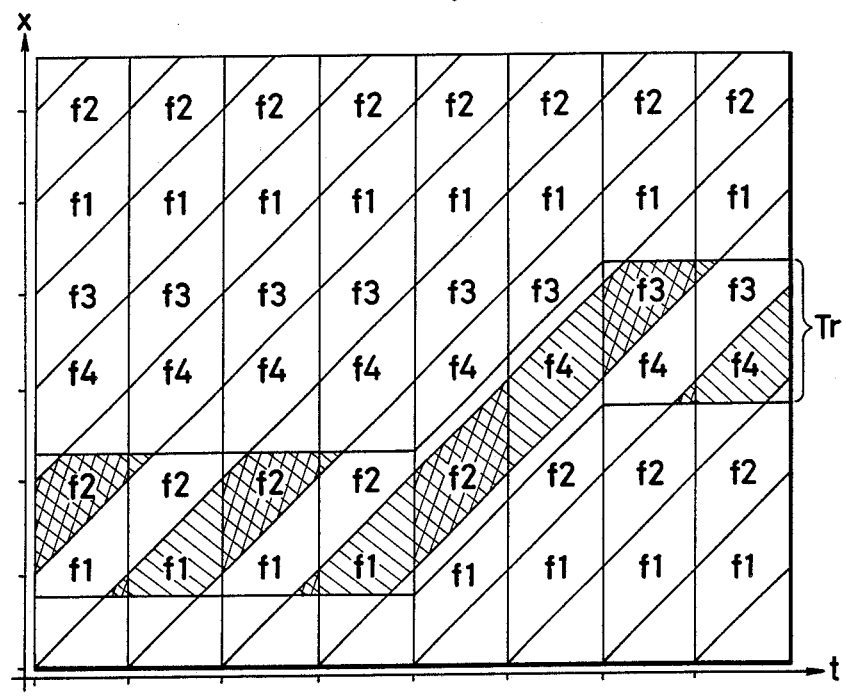
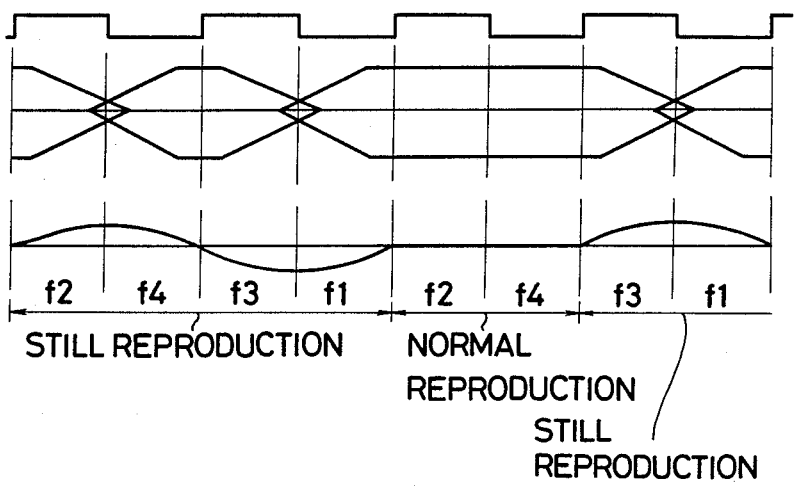

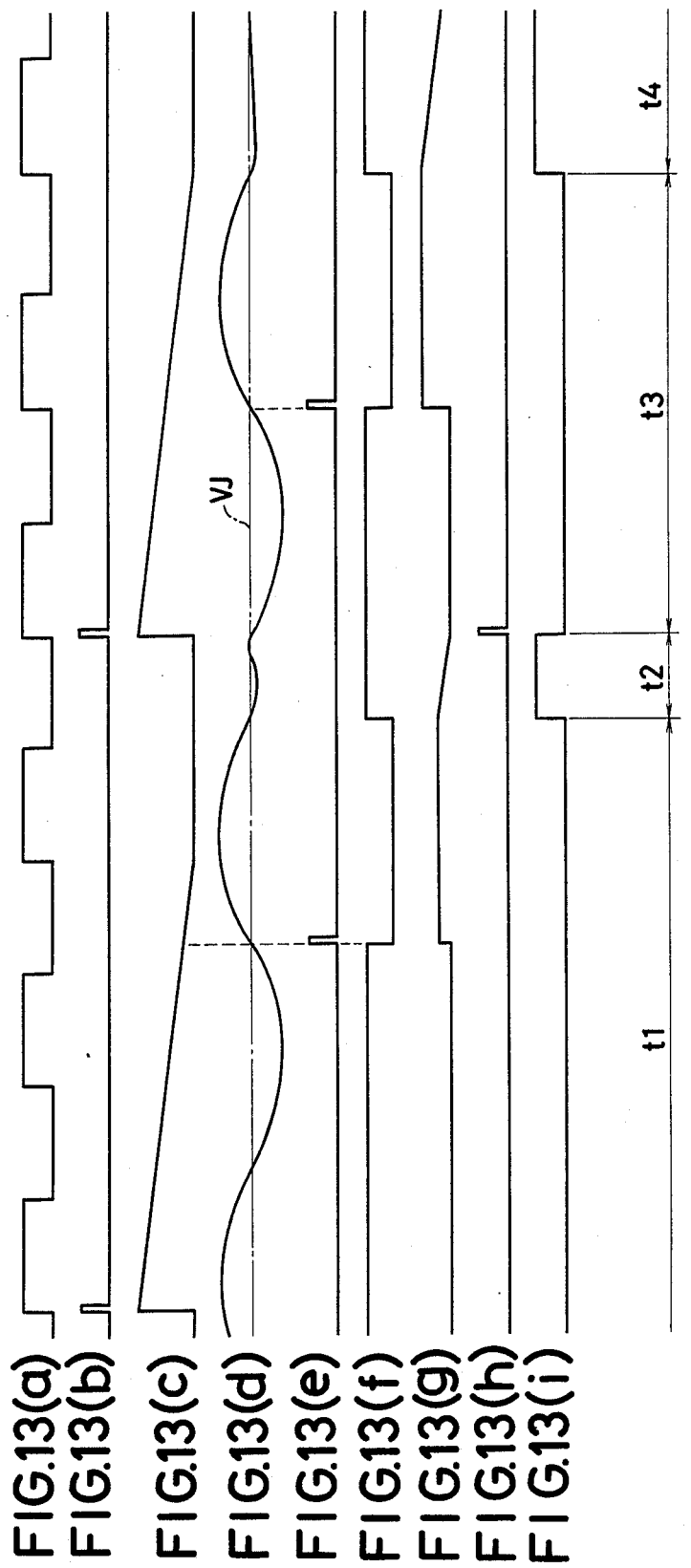

SIGNAL REPRODUCING APPARATUS HAVING MEANS FOR INTERMITTENTLY MOVING TAPE-SHAPED RECORD BEARING MEDIUM

This application is a continuation of application Ser. No. 779,668, filed Sept. 24, 1985, and now abandoned.

BACKGROUND OF THE INVENTION

1. Field of the Invention:

This invention relates to a signal reproducing apparatus wherein signals recorded on a record bearing medium having many recording tracks formed thereon are reproduced by a reproducing head which is arranged to periodically trace the medium.

2. Description of the Prior Art:

In this specification, apparatuses of the above-stated kind are represented by way of example by a two-head helical scanning type video tape recorder (hereinafter will be called VTR for short). In the VTR of this type, in order to reproduce a still picture without any noise bars (hereinafter will be called noiseless still reproduction), the VTR of the above-stated kind has been arranged to detect the rotation phase of the reproducing head relative to the recording tracks by reproducing control signals (hereinafter referred to as CTL signals) which are recorded in the longitudinal direction of a magnetic tape employed as the record bearing medium and to bring the travel of the tape to a stop by using information on the phase thus detected. Further, slow motion reproduction has been arranged to be carried out by alternately repeating the noiseless still reproduction and normal reproduction. The details of the slow motion reproduction of this type (hereinafter will be called noiseless slow reproduction) are as described below with reference to FIG. 1 of the accompanying drawings:

Referring to FIG. 1, during a period from a point of time t0 to another point t1, the capstan motor which is used for control over tape feeding is controlled to accelerate its rotation. Then, the motor comes to rotate at a constant speed (lower than a normal speed) at the time t1. Following this, one of the CTL signals which have been written in along the edge of the tape in a predetermined positional relation to recording tracks every time one frame portion of a video signal is recorded is detected at a point of time tc. The tape is allowed to travel at the constant speed during the period from the point of time tc to another point t2. Then, the capstan motor is stopped by brake application to have the tape in repose during a next period between points of time t2 and t3 to have the tape under still reproduction. The process of still reproduction is repeated a number of times according to the desired speed of reproduction. Following this, the above-stated operation is repeated to carry out the noiseless slow reproduction. An extent of tape movement between points Q0 and Q3 represent one frame. A tape moving extent Qc before detection of the CTL signal is controlled to be in the middle of the tape moving extent from the point Q0 to the point Q3.

The operating principle of the noiseless slow reproduction by the conventional tracking method using the CTL signal is as described above. As apparent from the above description, the CTL signal serves as a reference signal indispensable for control over the stopping position of still reproduction. The illustration of FIG. 1 includes a magnetic tape 4; recording tracks 5; the CTL signal; and a still reproduction point S.

Meanwhile, as a result of a recent tendency to high density recording, it has been proposed and put into practice to arrange a VTR to perform tracking without recording and reproducing the CTL signal. However, unlike the VTR using the CTL signal, the VTR of this kind has been incapable of readily finding a positional relation between the head and the track and, therefore, hardly usable for slow motion reproduction.

SUMMARY OF THE INVENTION

Such being the background situation, it is an object of the present invention to provide a signal reproducing apparatus which is capable of obtaining an adequate reproduced signal without recourse to any control signal that is recorded in the travelling direction of a record bearing medium.

It is another object of this invention to provide a signal reproducing apparatus which is capable of accurately performing an intermittent feeding operation on a record bearing medium.

Under this object, a signal reproducing apparatus arranged according to this invention as an embodiment thereof to reproduce recorded signals from a record bearing medium on which many recording tracks are formed comprises: a reproducing head arranged to periodically trace the record bearing medium; moving means for moving the record bearing medium; control means for controlling the moving means in such a manner that the record bearing medium alternately repeats assuming a reposed state and a moving state; and moving extent determining means which is arranged to determine, by using the output of the reproducing head while the record bearing medium is in the reposed state, a moving extent to which the medium is to be moved in the moving state immediately following the reposed state.

It is a further object of this invention to provide a signal reproducing apparatus which is capable of highly accurately detecting a positional relation between a recording track and a reproducing head.

Under that object, a signal reproducing apparatus arranged according to this invention as another embodiment thereof to reproduce recorded signals by tracing with a rotary head a record bearing medium, on which many recording tracks are formed at a given fixed pitch by allowing the medium to travel at a predetermined speed, comprises: means for generating a first periodic signal relative to the period of rotation of the rotary head; means for generating a second periodic signal indicative of a tracking error of the rotary head relative to one of the recording tracks; and means for counting a signal which is to be counted and has a frequency related to the above-stated predetermined speed for a period of time corresponding to a phase difference between the first and second periodic signals.

It is a still further object of this invention to provide a signal reproducing apparatus which is capable of obtaining an adequate reproduced signal by detecting a stopping position of a record bearing medium with a very high degree of precision.

Under this object, a signal reproducing apparatus arranged according to this invention as a further embodiment thereof to reproduce recorded signals by tracing with a rotary head a record bearing meidum, on which many recording tracks are formed at a given fixed pitch by allowing the medium to travel at a predetermined speed, comprises means for generating a first periodic signal relative to the period of rotation of the rotary head; means for generating a second periodic signal indicative of a tracking error of the rotary head relative to one of the recording tracks; moving means for moving the record bearing medium; pulse signal generating means for generating a pulse signal relative to the medium moving operation of the moving means; detecting means for detecting that the pulses of the pulse signal have been produced in number corresponding to a phase difference between the first and second periodic signals; and control means for controlling the moving means on the basis of the output of the detecting means.

These and other objects and features of this invention will become apparent from the following detailed description of embodiments thereof taken in connection with the accompanying drawings.

BRIEF DESCRIPTION OF THE DRAWINGS

FIGS. 2A and 2B(a) to 2B(d) show a condition obtained on a magnetic tape when the tape is brought to a stop without control and the timing of signals.

FIGS. 3A and 3B(a) to 3B(d) show a condition obtained on the magnetic tape when the tape is brought to a stop in an ideal position and the timing of signals.

FIG. 4A is a chart showing the relation of the tracing locus of a reproducing head to recording tracks which obtains during noiseless slow reproduction. FIGS. 4B(a), 4B(b) and 4B(c) show in a timing chart various signals produced within a VTR during the noiseless slow reproduction.

FIGS. 13(a) to 13(i) show in a timing chart the operation of the circuit arrangement of FIG. 12.

DETAILED DESCRIPTION OF THE PREFERRED EMBODIMENT

Figure 1:
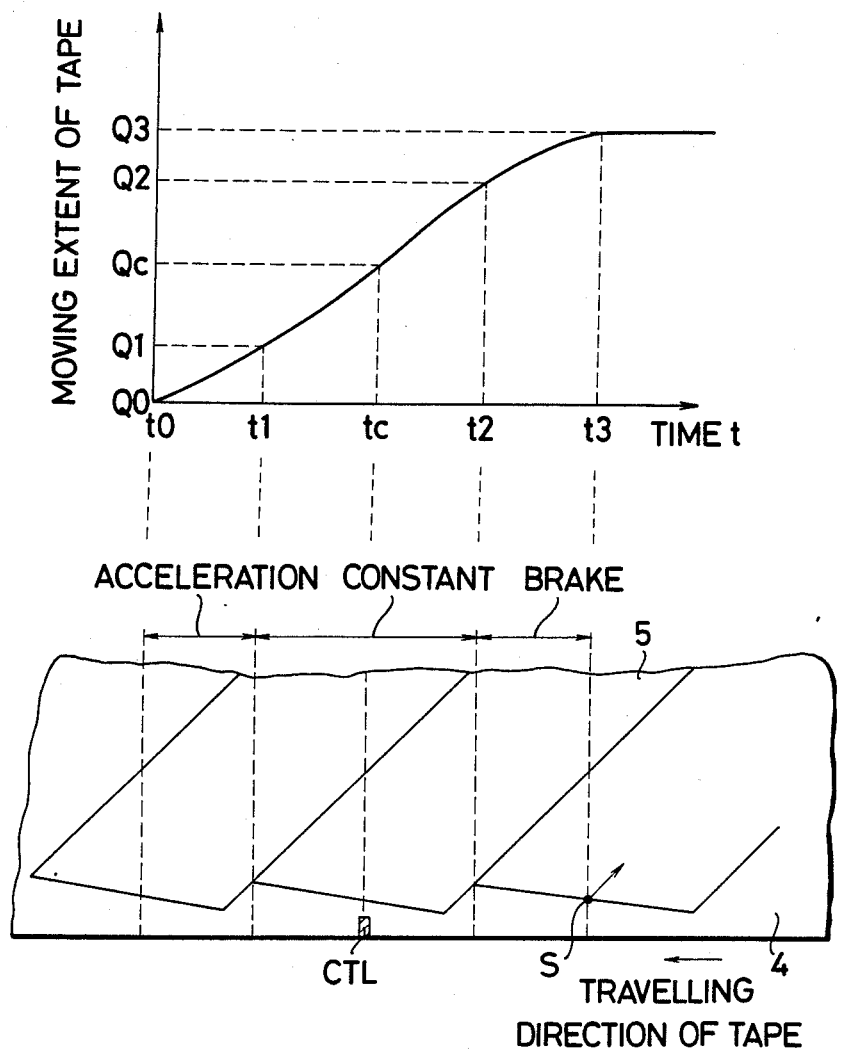
FIG. 1 illustrates the operation of conventional slow motion reproduction.

In the embodiment of this invention described hereinafter, the invention is applied to a VTR which employs the known four-frequency pilot method for tracking. The relation of the tracing locus of a reproducing head to recording tracks of a magnetic recording tape which obtains during a still reproduction operation of the VTR and a tracking error signal (hereinafter referred to as an ATF signal) which is representative of the deviation of the head from an applicable recording track will be first described. Further, the VTR is assumed to be of the two-rotary head type and to be arranged to make still reproduction (called frame still reproduction) of two field portions of a video signal by reproducing one field portion after the other.

FIGS. 2A and 2B(a) to 2B(d) show a condition obtained on a magnetic tape when the tape is brought to a stop without control and the timing at which each of various signals is produced. Further, FIGS. 3A and 3B(a) to 3B(d) show a condition obtained on the mangeic tape when the tape is brought to a stop in an ideal position and the timing of each signal. Referring to FIGS. 2A and 3A, the illustrations include a tracking locus 1 of the head; the travelling direction 2 of the tape; the tracing direction 3 of the head; a tape 4; and recording tracks f1 to f4 which have pilot signals of different frequency values f1 to f4 respectively recorded therein. FIGS. 2B(a) and 3B(a) show a head change-over signal of 30 Hz (hereinafter referred to as the 30 PG signal). FIGS. 2B(b) and 3B(b) show the frequencies of the pilot signals recorded in the tracks being traced for reproduction of the video signal. FIGS. 2B(c) and 3B(c) show the ATF signal. FIGS. 2B(d) and 3B(d) show the envelope wave form of the reproduced signal.

During the still reproduction, the tracing locus of the head deviates from the video signal recording track to a degree as much as one track pitch per field. Therefore, as shown in FIG. 2B(c) or 3B(c), the ATF signal has one cycle of wave for every four fields. In case that the tape 4 comes to a stop in the state as shown in FIG. 2A, the maximum output point of one of the two heads becomes the video signal within an image or picture plane while the minimum output point of the other head also becomes the video signal within the same picture plane as indicated by X in FIG. 2B(d). This results in noise bars appearing on the image or picture plane.

The noise bar can be prevented from appearing on the picture plane by arranging the maximum output point of one head and the minimum output point of the other head to coincide with a head change-over point as shown in FIGS. 3A and 3B(a) to 3B(d). In other words, the noise bar can be prevented by arranging the access points of these heads to coincide with a track being reproduced and another track adjacent thereto when the tape 4 is brought to a stop. The state of the ATF signal in this instance is as follows: When the ATF signal is at zero level (more exactly stated, a level VJ determined by the equi-difference of frequency characteristics), it indicates that the heads are accurately tracing the recoring tracks. Therefore, still reproduction can be satisfactorily performed when the ATF signal is at the zero level at the time of change-over from one head to the other.

FIG. 4A shows the relation of the tracing loci of the heads to the recording tracks which obtains when noiseless slow reproduction is performed by a VTR of the kind arranged to perform recording or reproduction by means of two heads of different azimuth angles. FIGS. 4B(a) to 4B(c) show in a timing chart the states of various signals produced within the VTR during the noiseless slow reproduction. In FIG. 4A, a referencce symbol "t" denotes the direction of the lapse of time; a symbol "x" the direction in which the heads move; another symbol "Tr" denotes the tracing tracks which are indicated in parallelograms. Further, in the drawing, symbols f1 to f4 denote pilot signals superimposed on recording tracks. With the VTR arranged in this manner, still reproduction is performed for a period of two frames and normal reproduction for a period of one frame. By this, slow motion reproduction can be carried out at an apparent speed which is ⅓ of the normal speed.

FIG. 4B(a) shows a rectangular wave form signals of 30 Hz produced in synchronism with the rotation of the heads (hereinafter referred to as 30 PG signal). FIG. 4B(b) shows the envelope wave form of a reproduced video signal. FIG. 4B(c) shows the tracking error signal. In the case of still reproduction, the tracing locus of each head deviates from the video signal recoridng track to an extent of one track pitch during every one field period. As a result, as shown in FIG. 4B(c), the tracking error signal comes to have one cycle of wave for every four fields. Let us asuume that a level of the tracking error signal obtained when the center of the tracking locus and that of the recording track comes to coincide with each other in that instance is called a just track level. The noise bar can be expelled from a reproduced picture plane by arranging the timing for change-over from one head to the other to coincide with the just track level of the tracking error signal.

Figure 5:
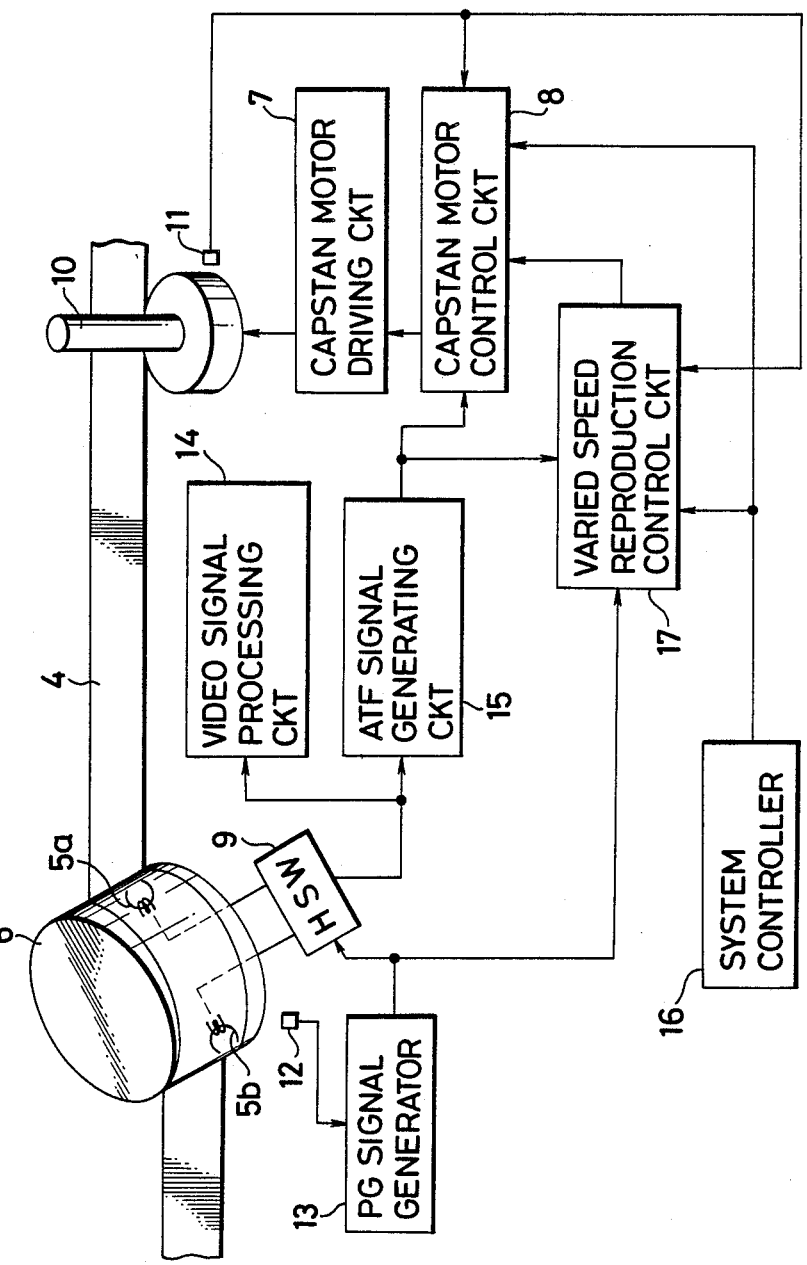
FIG. 5 is a schematic diagram showing the arrangement of a VTR as an embodiment of this invention.

An embodiment of this invention is arranged as described below with reference to the drawings:

FIG. 5 schematically shows the outline of arrangement of a VTR arranged in accordance with this invention as the embodiment thereof. The illustration includes a magnetic tape 4; and rotary reproducing heads 5a and 5b. The heads 5a and 5b have different magnetizing directions. These heads are carried by a cylinder 6. The cylinder 6 is arranged to guide the magnetic tape 4 along the periphery thereof. Signals reproduced by these heads 5a and 5b are made into a continuous signal through a head switching circuit 9 (hereinafter referred to as the HSW circuit). The continuous reproduced signal is supplied to a video signal processing circuit 14 and the ATF signal generating circuit 15. The HSW circuit 9 is arranged to be under the control of the 30 PG signal. The continuous signal obtained from the HSW circuit 9 is processed by the video signal processing circuit 14 to have its signal component separated and brought back into the original signal form thereof (for example, a video signal similar to an NTSC signal). Meanwhile, the ATF signal generating circuit 15 separates only the pilot signal component of four different frequencies from the continuous reproduced signal and produces the ATF signal through a known signal processing operation. Briefly stated, the signal processing operation is as follows: A signal (local pilot signal) of the same frequency as a pilot signal superimposed on the video signal of a recording track to be reproduced (hereinafter referred to as the main track) is used to have the reproduced pilot signal multiplied by the local pilot signal. Then, the level of the result of this multiplication is compared with that of a frequency signal representing a difference between pilot signals reproduced from recording tracks which are adjacent to the main track on both sides thereof. A tracking error is thus detected to give the ATF signal.

The ATF signal thus obtained is supplied to a capstan motor control circuit 8. The capstan motor control circuit 8 is arranged to control a capstan 10 via a capstan motor driving circuit 7 during a normal reproducing operation. The capstan 10 is arranged to cause the magnetic tape 4 to travel in conjunction with a pinch roller which is not shown in a well known manner. The rotation of the capstan 10 is detected by a detector 11. The detector 11 is arranged to produce an X number of pulses per turn of the capstan 10. These pulses are called a capstan FG signal. The capstan FG signal is supplied to the capstan motor control circuit 8 and also to a varied speed reproduction control circuit 17 which will be described in detail later herein. With this capstan FG signal supplied to the capstan motor control circuit 8, a speed control loop is formed.

Figure 6:
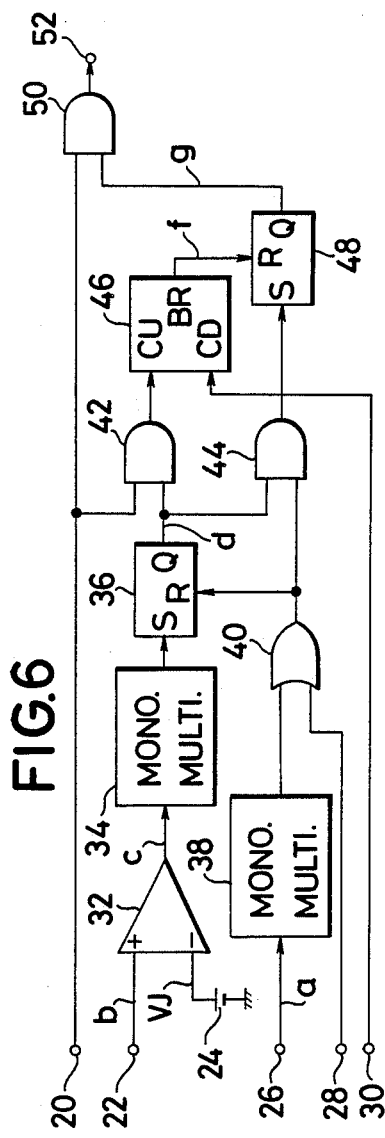
FIG. 6 is a circuit diagram showing by way of example the details of a varied speed reproduction control circuit included in the VTR shown in FIG. 5.
Figure 7:
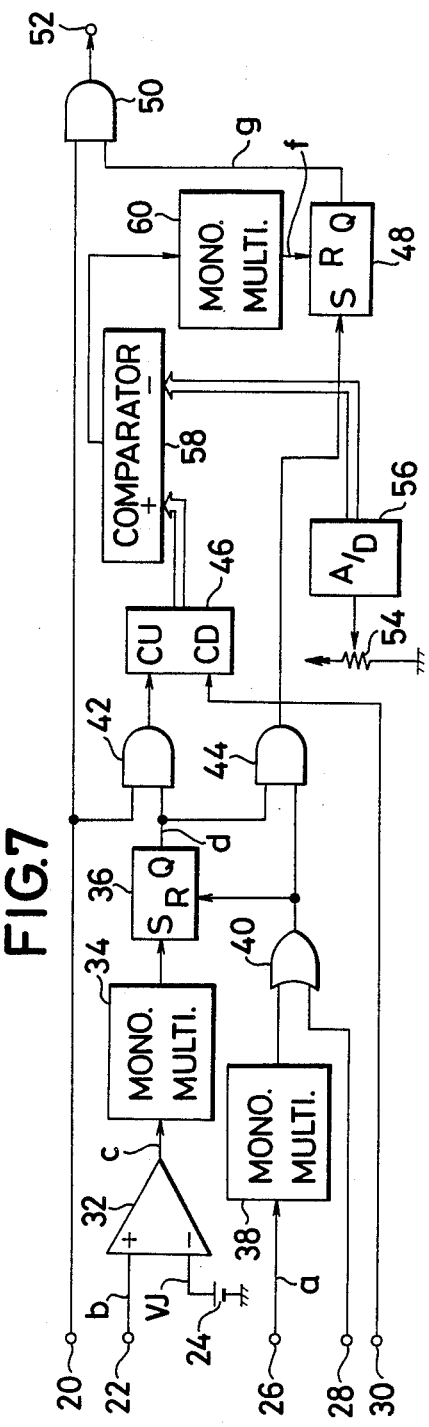
FIG. 7 is a circuit diagram showing another example of arrangement of the varied speed reproduction control circuit of FIG. 5.

The varied speed reproduction control circuit 17 is arranged to receive the 30 PG signal, the capstan FG signal, the ATF signal and a signal which is produced from a system controller 16. The circuit 17 performs control over the rotation of the capstan for still reproduction and slow motion reproduction. Examples of specific circuit arrangement of this varied speed reproduction control circuit 17 are as described below:

FIGS. 6 and 7 are circuit diagrams showing two examples of the arrangement of the varied speed reproduction control circuit 17 of FIG. 5. FIGS. 8(a) to 8(g) show in a timing chart the wave forms of signals of various parts indicated in FIG. 6. The following describes the operation of the circuit arrangement shown in FIG. 6 with reference to FIGS. 8(a) to 8(g).

Figure 8:
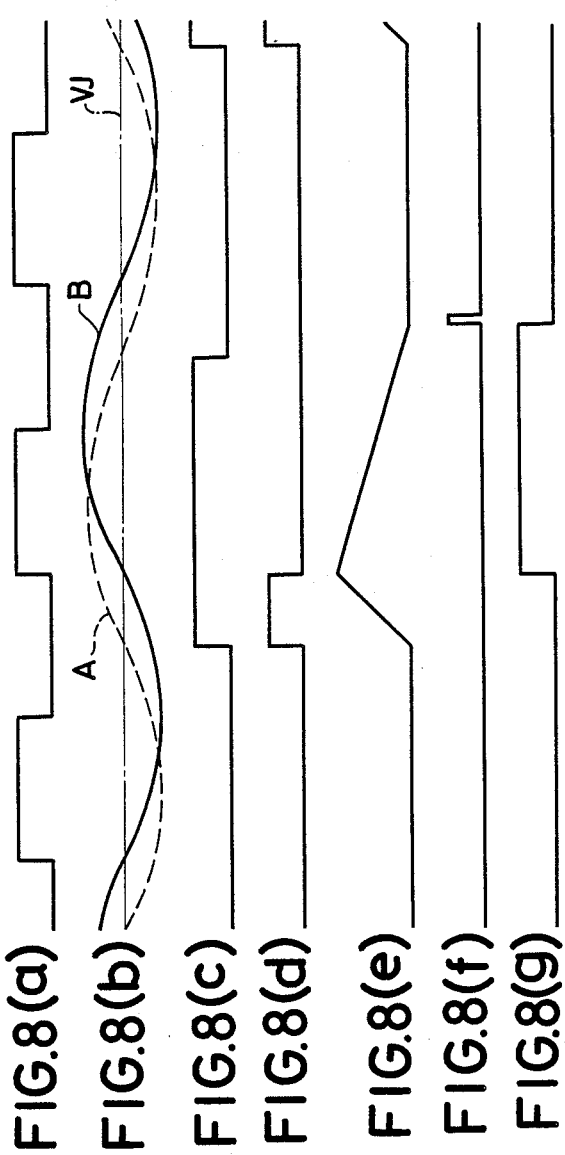
FIGS. 8(a) to 8(g) show in a timing chart the operation of the circuit of FIG. 6.

The circuit of FIG. 6 includes a terminal 20 which is arranged to receive a clock pulse signal of the same frequency as the capstan FG signal used for recording. A terminal 22 is arranged to receive the ATF signal which is as shown in FIG. 8(b). A terminal 26 is arranged to receive the 30 PG signal which is as shown in FIG. 8(a). A terminal 28 is arranged to receive a low level signal from the system controller 16 under an insrtruction for still reproduction. Another terminal 30 is arranged to receive the capstan FG signal.

A comparator 32 is arranged to use the level of the ATF signal obtained when the head is in an on-track state (or approximately a zero level as indicated by a point VJ in FIG. 8(b)) as a threshold value. A monostable multivibrator 34 is arranged to produce a pulse signal at the rise of the output of the comparator 32, which is as shown in FIG. 8(c). A flip-flop 36 (herein after referred to as FF) is arranged to be set by the pulse produced from the monostable multivibrator 34. The 30 PG signal received at the terminal 26 is supplied to a monostable multivibrator 38, which produces a pulse signal at the rise of the 30 PG signal. This pulse is arranged to reset the FF 36 via an OR gate 40.

The output of the FF 36 which is as shown in FIG. 8(d) is supplied to an AND gate 42. A counter 46 is arranged to count upward the pulses of the clock pulse signal supplied to the terminal 20 while the FF 36 is in a set state. When the clock signal counting operation of the counter 46 comes to a stop, the pulse produced from the monostable multivibrator 38 comes via the OR gate 40 and the AND gate 44 to set another FF 48. The FF 48 is arranged to be reset by a borrow signal (FIG. 8(f)) which is produced with the pulses of the capstan FG signal counted downward by the counter 46. While the FF 48 is in a set state, the clock signal is supplied via an AND gate 50 to an output terminal 52.

In the case of another example shown in FIG. 7, while the counter 46 is connting downward, the FF 48 is arranged to be reset when the counted value of the counter 46 becomes smaller than a data produced from an analog-to-digital (A/D) converter 56. In other words, the FF 48 is reset by the output of a monostable multivibrator 60 which is triggered by the fall of a signal produced from a comparator 58. The output data of the A/D converter 56 is arranged to be adjustable by means of a volume 54.

The operation of the circuit arrangement described above is as follows: When an instruction for still reproduction is produced from the system controller 16, the rotation of the capstan 10 is temporarily brought to a stop at a desired timing. In this instance, the ATF signal is assumed to be in a state as indicated by a broken line A in FIG. 8(b). Then, the noiseless still reproduction (or noiseless field still reproduction) can be performed by bringing the ATF signal to a state as shown by a full line B in FIG. 8(b).

The signal produced from the FF 36 as shown in FIG. 8(d) is at a high level during a period after the ATF signal (FIG. 8(b)) exceeds the on-track level VJ and before a next rise of the 30 PG signal which is as shown in FIG. 8(a). This high level period represents the phase deviation of the ATF signal and the 30 PG signal from an ideal state. During this period, the counter 46 is counting the clock signal (see FIG. 8(e)). A length of tape obtained by moving the tape at the tape travelling speed for recording (or for normal reproduction) for this high level period of the output signal of the FF 36 corresponds to the positional deviation of the tape from an ideal tape stopping position. Therefore, assuming that the clock signal which is supplied to the terminal 20 is arranged to be of the same frequency as that of the capstan FG signal obtained at the time of recording, the counted value of the counter 46 indicates a number of the pulses of the capstan FG signal to be produced by rotating the capstan 10 from that point of time until the tape 4 comes to the ideal stopping position. In other words, the capstan 10 is allowed to rotate after the pulses of the clock signal are counted upward by the counter 46. Then, the pulses of the capstan FG signal which are generated according to the capstan rotation are counted downward by the counter 46. When the counted value of the counter 46 reaches zero, the tape is judged to have reached the ideal stopping position and is thus brought to a stop. More specifically, when the output signal of the FF 48 is at a high level as shown in FIG. 8(g), the capstan 10 is driven by the clock signal coming via the AND gate 50; and then the driving operation on the capstan 10 is brought to a stop by a borrow signal produced from the counter 46 as shown in FIG. 8(f).

In case that the ideal timing for stopping the driving operation on the capstan does not obtain when the counted value of the counter 46 becomes zero because of a change or variation in some physical property, the arrangement of the example shown in FIG. 7 solves that problem. More specifically, the stopping position can be adjusted as desired by the operator by manually operating the volume 54 to change the data produced from the A/D converter 56. Furthermore, once this volume 54 is adjusted, the tape thereafter always can be brought to a stop in the ideal stopping position. It is another advantage of the arrangement that the stopping position can be easily adjusted by the operator as the stopping position changes as much as the volume 54 is adjusted.

With the varied speed reproduction control circuit arranged as described above, the VTR is capable of accurately detecting a degree of deviation from the ideal stopping position as distance information by counting the pulses of the clock signal of the same frequency as the capstan FG signal obtained at the time of recording with the counting performed for a period corresponding to a phase difference between the ATF signal and the 30 PG signal. This enables the VTR also to adequately carry out still reproduction. Further, in the case of the arrangement shown in FIG. 7, the tape stopping position is freely adjustable by a manual adjusting operation in the event of a change or variation in some physical property of the apparatus. The tape, therefore, can be brought to a stop in an ideal stopping position without fail.

Figure 9:
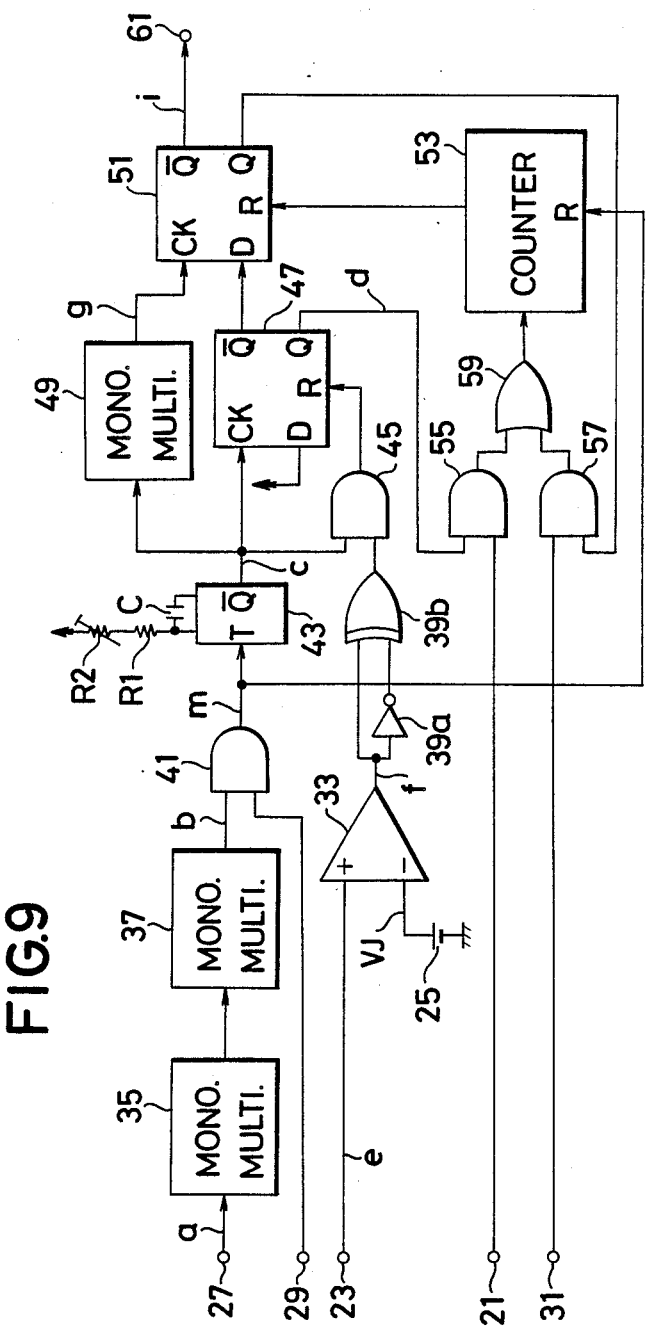
FIG. 9 is a circuit diagram showing a further example of arrangement of the varied speed reproduction control circuit of FIG. 5.
Figure 10:
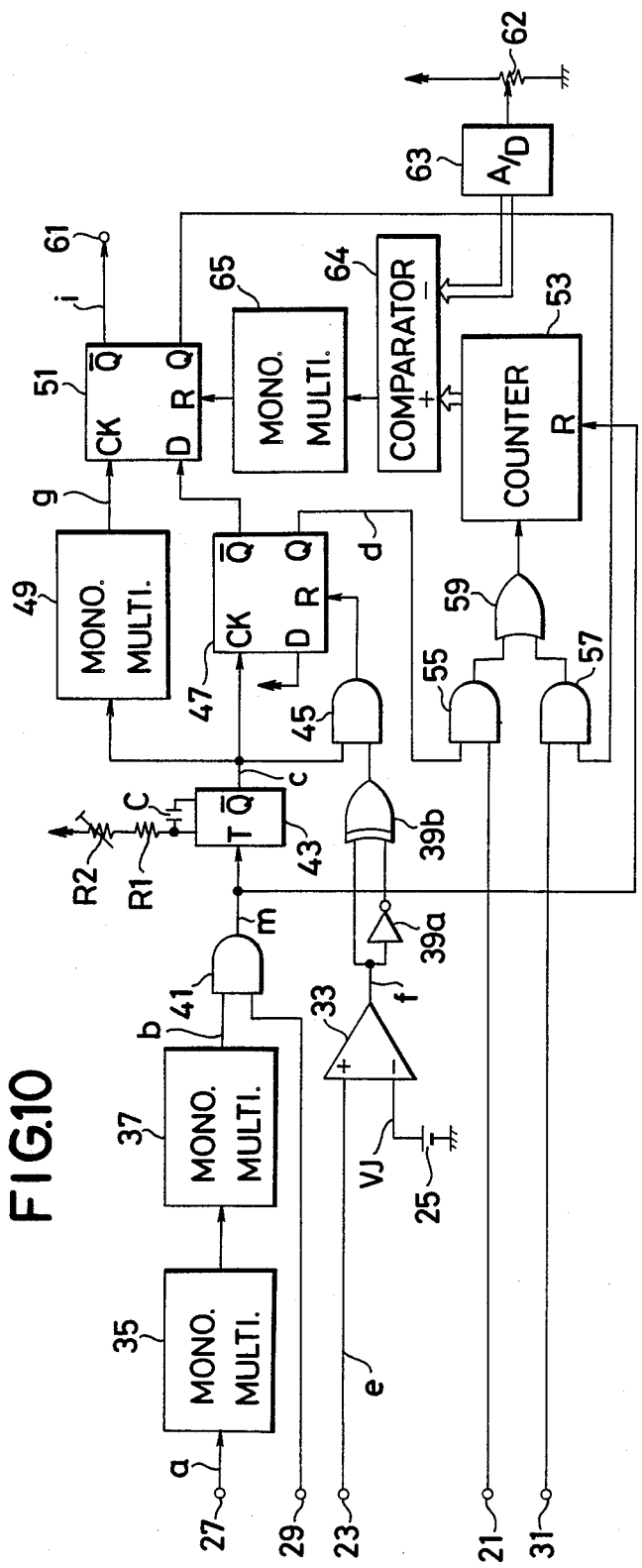
FIG. 10 is a circuit diagram showing a further example of arrangement of the varied speed reproduction control circuit of FIG. 5.

FIGS. 9 and 10 show further examples of arrangement of the varied speed reproduction control circuit shown in FIG. 5. FIGS. 11(a) to 11(m) show in a timing chart the operation of each of various parts shown in FIG. 9.

Figure 11:
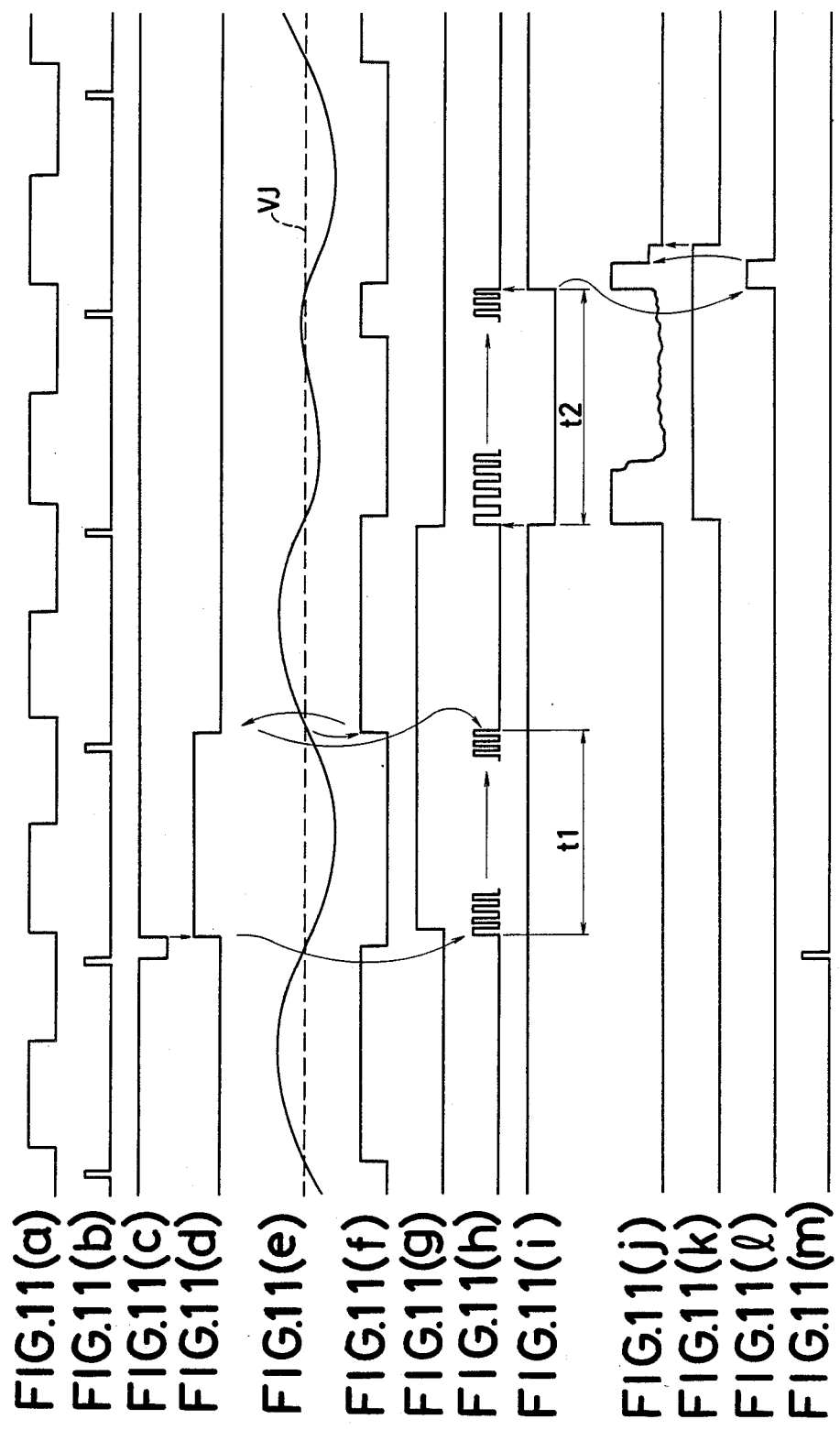
FIGS. 11(a) to 11(m) show in a timing chart the operation of the circuit arrangement of FIG. 9.

Referring to FIG. 9, a terminal 27 is arranged to receive the 30 PG signal which is as shown in FIG. 11(a). The phase of this 30 PG signal is shifted by monostable multivibrators 35 and 37 and is also has its wave form shaped by them. Then, the monostable multivibrator 37 produces pulses as shown in FIG. 11(b) (hereinafter referred to as PG pulses). A terminal 29 is arranged to receive from the system controller 16 an instruction signal for stopping the tape 4 from travelling. The stopping instruction signal is arranged to remain at a high level for a period corresponding to about one frame or two fields.

With this tape stopping instruction signal supplied via the terminal 29, the PG pulses which are produced from the monostable multivibrator 37 are gated by an AND gate 41 for a period during which the instruction signal is at a high level. The gated pulse which is as shown in FIG. 11(m) is then supplied as a trigger pulse to a monostable multivibrator 43 which consists of a T flip-flop. The monostable multivibrator 43 is provided for the purpose of adjustment of tracking. The tracking adjustment is performed as follows: A time constant which is determined by a resistor R1, a variable resistor R2 and a capacitor C can be manually adjusted by means of the variable resistor R2. The width of a pulse which is produced by the monostable multivibrator 43 as shown in FIG. 11(c) is adjusted by the adjusted time constant. By this, tracking can be manually adjusted to a certain degree. The rise of this output of the monostable multivibrator 43 is arranged to roughly coincide with the rise of the 30 PG signal.

The $\overline{Q}$ output of the monostable multivibrator 43 which is as shown in FIG. 11(c) is supplied to the CK terminal of a D flip-flop (hereinafter referred to as DFF) 47. Upon receipt of this, the level of the Q output of the DFF 47 changes from a low level to a high level as shown in FIG. 11(d). A terminal 21 is arranged to supply a clock signal of the same frequency as that of a capstan FG signal obained at the time of recording. When the level of the Q output of the DFF 47 changes to the high level, the clock signal is applied to a counter 53 via an AND gate 55 and an OR gate 59. The conter 53 then begins to count upward the pulse of this clock signal. Meanwhile, a terminal 23 receives the ATF signal which is as shown in FIG. 11(e). The ATF signal is then compared by a comparator 33 with a level VJ which represents a level to be obtained when the head is in an on-track state. The reproducing head is, therefore, in the on-track state at the time of the rise and fall of the output of the comparator 33 which is as shown in FIG. 11(f). The edges of the fall and rise of the output of the comparator 33 are detected by an edge detection circuit which consists of an inverter 39a and an exclusive OR circuit 39b and are transformed into narrow edge pulses. These edge pulses are arranged to reset the DFF 47 via an AND gate 45. The level of the Q output of the DFF 47 which is as shown in FIG. 11(d) thus becomes high and remains high during a period between the rise of the $\overline{Q}$ output of the monostable multivibrator 43 and the abovestated edge pulses which are indicated at a part t1 of FIG. 11(h). Accordingly, the pulses of the clock signal is up counted by the counter 53 during this period. Further, a length of the tape portion allowed to travel at a recording speed for this high level period of the Q output of the DFF 47 corresponds to the positional deviation of the tape from an ideal tape position. In other words, this indicates a number of pulses of the capstan FG signal produced after passing the ideal tape stopping position.

Therefore, after the pulses of the clock signal have been counted up by the counter 53, the capstan 10 is allowed to rotate. Then, the pulses of the capstan FG signal resulting from the rotation of the capstan 10 are counted upward further by the counter 53. When the counted value of the counter reaches nF (wherein n represents an interger and F a number of pulses of the capstan FG signal generated with the tape moved to the extent of one track pitch), the tape is considered to have come to an ideal stopping position and is then stopped from travelling any further.

The output of the monostable multivibrator 49 which is as shown in FIG. 11(g) becomes a high level after the rise of the $\overline{Q}$ output of the monostable multivibrator 43 and stays at the high level at least for a period of one frame and preferably for a period of about one frame. The counter 53 comes to stop up counting the pulses of the clock signal at least during this high level period of the $\overline{Q}$ output of the monostable multivibrator 49. The fall of the output of the monostable multivibrator 49 triggers the DFF 51. The level of the Q output of the DFF 51 changes to a high level. The $\overline{Q}$ output of the DFF 51 which is as shown in FIG. 11(i) is supplied via a terminal 61 to the capstan motor control circuit 8. The capstan begins to rotate. The capstan FG signal which comes to the terminal 31 according as the capstan rotates is supplied to the counter 53 via the AND gate 57 and the OR gate 59. The counter 53 up counts the pulses of the capstan FG signal. Assuming that the number of pulses of the capstan FG siganl produced while the tape 4 is moved to the extent of one track pitch is 16 and that the tape is arranged to come to a stop at intervals of two frames, the tape comes to an ideal stopping position when the counted value of the counter 53 reaches 64.

More specifically, in the case of the arrangement shown in FIG. 9, if the counter 53 is a binary counter, the high level output of the counter 53 is supplied to the reset terminal of the DFF 51 when the value of the eighth bit becomes "1". Then, the Q output of the DFF 51 changes to a low level when the tape 4 is in the ideal stopping position. Therefore, the counter 53 is arranged to count the pulses of the capstan FG signal over the period during which the level of the Q output of the DFF 51 stays high as indicated by a part t2 in FIG. 11(i).

In the example of arrangement shown in FIG. 10 on the other hand, the data to be normally produced from the A/D converter 63 is arranged to be 64. The DFF 51 is arranged to be reset by the output of the monostable multivibrator 65 which is produced in response to the fall of the output level of the comparator 64. Then, the level of the Q output of the DFF 51 becomes low when the tape comes to the ideal stopping position.

With the Q output of the DFF 51 thus having become a low level, the up counting operation of the conter 53 on the pulses of the capstan FG signal comes to a stop. Meanwhile, the $\overline{Q}$ output of the DFF 51 cahnges to a high level. The high level $\overline{Q}$ output of the DFF 51 is supplied to the capstan motor control circuit 8 via the terminal 61. This brings the capstan 10 to a stop. The tape 4 then comes to a stop in the ideal stopping position. FIG. 11(j) shows a current (the output of the capstan motor driving cicrucit 7) which is actually applied to the capstan motor. FIG. 11(k) shows a detection signal representing the actual rotating direction of the capstan 10. FIG. 11(l) shows a period during which brake is applied to the capstan 10.

More specifically, brake application is effected to the capstan 10 when the DFF 51 is reset and, immediately before it comes to a stop, a very weak driving current is applied again in the forward direction. With the capstan arranged to be brought to a stop in this manner, the capstan 10 very stably comes to stop without turning backward.

The volume 62 of FIG. 10 is arranged to permit manual tracking adjustment by the operator in the same manner as the volume 54 of FIG. 7, because: Even with the resistor R2 is adjusted beforehand in such a manner as to have the tape 4 come to a stop in the ideal stopping when the data produced from the A/D converter 63 becomes 64, some physical change might prevent the tape 4 from stopping at the ideal stopping point as mentioned in the foregoing. In that event, the stopping point of the tape can be adjusted by manually adjusting the position of this volume 62. As mentioned in the foregoing, the stopping point or position of the tape varies as much as the volume 62 is adjusted. It is, therefore, linear adjustment. Therefore, this adjustment is much easier for the operator than adjusting the stopping position by changing the value of the resistor R2.

The VTR which has the varied speed reproduction control circuit arranged as shown in FIG. 9 or 10 is also capable of detecting the positional relation of the tracing locus of the rotary head to the recording tracks being traced by virtue of the arrangement to count, for a period correspoinding to a phase difference between the 30 PG signal and the ATF signal, the pulses of a clock signal of the same frequency as that of the capstan FG signal which was obtained at the time of recording. This arrangement can be advantageously used for carrying out still reproduction.

The foregoing description has not specifically included slow motion reproduction. However, with the circuit of FIG. 9 employed, for example, slow motion reproduction can be carried out in the following manner: The capstan 10 is driven in the same manner as in normal reproduction for the period t2 in bringing the tape 4 to a stop. The pulse width of the output of the monostable multivibrator 49 is arranged to be equal to the period of two fields. Then, the slow motion reproduction can be performed by repeating the tape stopping operation.

In the cases of circuit arrangement of FIGS. 7 and 10, the manual adjustment of the tape stopping position by the operator is arranged to be carried out by adjusting the data produced from the A/D converter 56 or 63 which is to be supplied to the comparator 58 or 64. However, this adjustment may be carried out by presetting the output data when the counter 46 or 53 is reset and by adjusting the preset data.

Further, for obtaining the tracking error signal, a tracking error signal of the known four-frequency method is used. However, it goes without saying that a tracking error signal is also obtainable, for example, by means of a mere envelope detecting circuit or the like.

Figure 12:
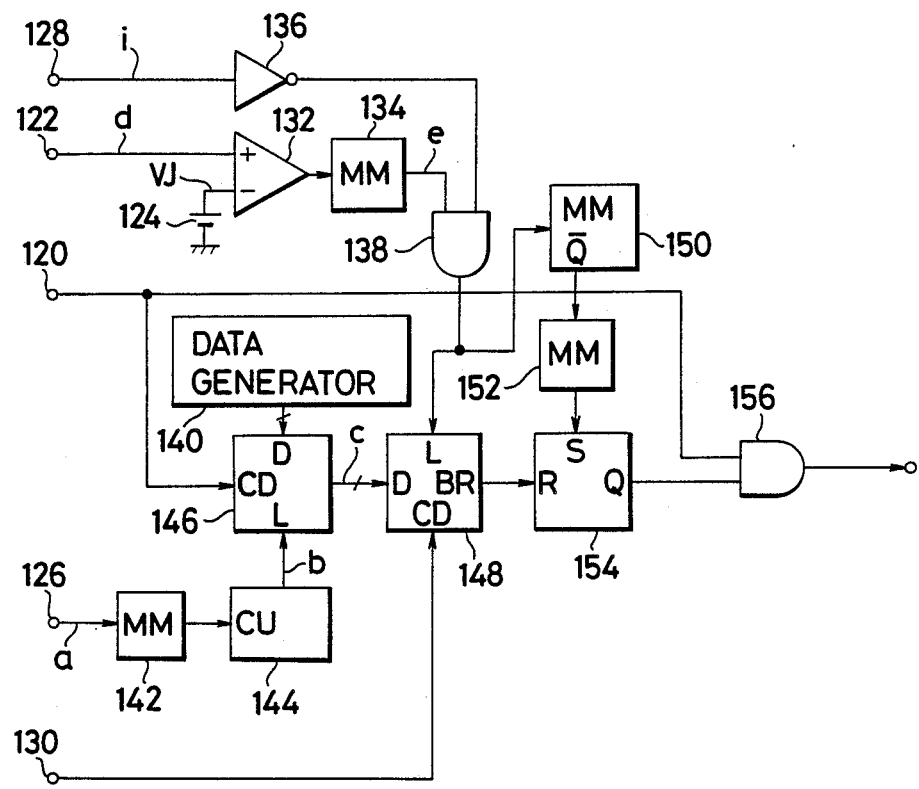
FIG. 12 is a circuit diagram showing a still further example of arrangement of the varied speed reproduction control circuit of FIG. 5.

FIG. 12 shows a still further example of arrangement of the varied speed reproduction control circuit 17 of FIG. 5. FIGS. 13(*a*) to 13(*i*) show in a timing chart the wave forms of signals obatned in vairous parts of the circuit arrangement of FIG. 12. The following describes the arrangement and the operation of the circuit of FIG. 12 with reference to FIGS. 13(*a*) to 13(*i*):

Referring to FIG. 12, a terminal 120 is arranged to receive a clock signal of the same frequency as a capstan FG signal obtained at the time of recording. A terminal 122 is arranged to receive the ATF signal which is as shown in FIG. 13(*d*). A terminal 126 is arranged to receive the 30 PG signal which is as shown in FIG. 13(*a*). A terminal 128 is arranged to receive a high level signal which is as shown in FIG. 13(*i*) while the capstan 10 is being driven. Another terminal 130 is arranged to receive the capstan FG signal.

A comparator 132 is arranged to use as a threshold value an input of a level to be obtained when the head is in an on-track state (indicated by a level VJ in FIG. 13(*d*)). A monostable multivibrator 134 is arranged to produce pulses as shown in FIG. 13(*e*) when the level of the output of the comparator 132 rises. The circuit arrangement includes an inverter 136; an AND gate 138; a data generator 140 which is arranged to produce a data corresponding to a number of pulses of the capstan FG signal produced when the tape is moved to an extent corresponding to four track pitches; a monostable multivibrator 142; a ternary counter 144 which is arranged to count the rises of the 30 PG signal; and a counter 146 arranged to be loaded with a data produced from a data generator 140 according to the output of the ternary counter 144 and to down count the data according to the above-stated clock signal. Another counter 148 is arranged to be loaded with the output value of the counter 146 which is as shown in FIG. 13(*c*) at a crossing point of the ATF signal and the just track level and to down count it according to the capstan FG signal. Further included in the circuit arrangement are monostable multivibrators 150 and 152, a flip-flop 154; and an AND gate 156. The operation of this circuit arrangement is as follows:

When the VTR is shifted to a slow motion reproduction mode, the travel of the tape 4 is first brought to a stop at a desired time point. Under this condition, the ATF signal comes to a state which is something like an arbitrarily selected still reproduction period t1 shown in FIG. 13(*d*). At this point of time, if a crossing point between the tracking error signal and the just track level is arranged to coincide with the rise of the 30 PG signal, there obtains a condition for noiseless still reproduction. Further, if a normal reproducing operation is allowed to begin from this crossing point, the reproducting head can be brought to an on-track state.

With the tape 4 coming to a stop, the level of the signal of FIG. 13(*i*) which represents a driven state of the capstan 10 becomes low to indicate that the capstan 10 has come to a stop. Under this condition, the counter 148 is loaded with the counted value of the counter 146 at the point of time when the ATF signal crosses the just track level. The VTR is shiftable to normal reproduction at this timing. However, in this instance, this timing is delayed as much as a period of two fields by means of the monostable multivibrators 150 and 152 and the timing is used for setting the FF 154 which is arranged to control the start and stop of the capstan 10.

The counter 146 is loaded, at a timing obtained by frequency dividing the 30 PG signal by three, with a data which is produced by the data generator 140 and is of a value corresponding to a number of pulses of the capstan FG signal obtained during a period of four track pitches. The counter 146 is thus arranged to down count a pulses of a clock signal which oscillates at the same frequency as the capstan FG signal obtained at the time of recording. Such being the arrangement, the counted value of the counter 146 comes to indicate, in the form of a number of pulses of the capstan FG signal, an off-track degree, or a degree of deviation, of one of the heads with the head arranged to be in an on-track state at the time of head change-over under a still reproduction condition. Therefore, the condition of the VTR can be shifted to a noiseless still reproduction condition by allowing normal reproduction to begin at the point of time when the tracking error signal delayed by two fields comes to cross the just track level; and then by bringing the tape 4 to a stop after feeding the tape 4 to an extent that produces a number of pulses of the capstan FG signal corresponding to a value with which the counter 148 is loaded. For that purpose, the counted value of the counter 148 is down counted with the pulses of the capstan FG signal; the FF 154 is arranged to be then reset by a borrow signal from the counter 148; and by this, the capstan 10 is brought to a stop.

While the capstan 10 in this specific example is arranged to be controlled in a pulse driving manner by means of the clock signal coming via the AND gate 156, that method is optional.

Again referring to FIGS. 13(*a*) to 13(*i*), reference symbol t1 denotes a still reproduction period; t2 and t4 denote normal reproduction periods; and t3 denotes a noiseless still reproduction period. With these periods consecutively repeated, a slow reproduction operation is performed at a speed ⅓ of a normal reproducing speed.

In the VTR which is arranged as described in the foregoing, the degree of deviation from an ideal stopping position is measured from the 30 PG signal and the ATF signal obtained under a still reproduction condition immediately before the slow reproduction. The result of this measurement is then used for tracking in the ensuing process of the noiseless still reproduction. Therefore, in accordance with the arrangement of this invention, an adequate slow motion reproduction can be accomplished without recourse to CTL signals.

What is claimed is:

1. An information signal reproducing apparatus for reproducing information signals from a tape-shaped record bearing medium on which many helical tracks are formed, comprising:
   (a) rotary head arranged to trace said tape-shaped record bearing medium;
   (b) moving means for moving said tape-shaped record bearing medium in longitudinally direction;
   (c) control means for controlling said moving means in such a manner that said moving means is alternately in a first state and a second state, said moving means moving said tape-shaped record bearing medium at a predetermined speed in said first state, and said moving means not moving said medium in said second state;
   (d) means for generating a first cyclic signal which relates to a rotary cycle of said rotary head;
   (e) means for generating a tracking error signal which indicates the tracking error of said reproducing head relative to one of said many tracks;

(f) means for generating a second cyclic signal in response to said tracking error signal when moving means is in said second state; and (g) determining means which is arranged to determine a moving extent to which said medium is to be moved in said first state immediately following said second state, according to a phase difference between said first and second cyclic signal.

2. An apparatus according to claim 1, wherein pilot signals of four different frequencies are cyclically recorded in said helical tracks, one in each of said helical tracks in sequence; and said tracking error signal generating means includes a circuit for separating said pilot signals from the signal reproduced by said reproducing head.

3. An apparatus according to claim 1, wherein said determining means further includes means for generating a first pulse signal of a predetermined frequency and counting means which is arranged to count the pulses of said first pulse signal for a period corresponding to said phase difference when said moving means is in said second state.

4. An apparatus according to claim 3, further comprising means for generating a second pulse signal which indicates a moving speed of said medium.

5. An apparatus according to claim 4, wherein said counting means is arranged to count the pulses of said second pulse signal when said moving means is in said first state.

6. An apparatus according to claim 5, wherein said control means includes comparison means for comparing the counted value of said counting means with a predetermined value; and said control means is arranged to determine a timing for shifting the state of said moving means from said first state to said second state on the basis of an output of said comparison means.

7. An apparatus according to claim 6, wherein said control means further includes manually operable means which is arranged to permit manual adjustment of said predetermined value.

8. An apparatus according to claim 1, wherein said control means includes means for generating a third cyclic signal having a cycle which is an integer times as much as the cycle of said first cyclic signal.

9. An apparatus according to claim 8, wherein said control means is arranged to determine the cycle of an alternation for the state of said moving means in response to said third cyclic signal.

10. An apparatus according to claim 1, wherein one field of a video signal is recorded in each of said many helical tracks.

11. An information signal reproducing apparatus for reproducing information signals from a record bearing medium, on which many helical tracks are formed at a predetermined pitch, comprising:
(a) a rotary head arranged to trace said tape-shaped record bearing medium;
(b) moving means for moving said tape-shaped record bearing medium at a predetermined speed;
(c) means for generating a first cyclic signal having a cycle corresponding to the rotation period of said rotary head;
(d) means for generating a tracking error signal which indicates the tracking error of said rotary head relative to one of said many tracks;
(e) means for generating a second cyclic signal having a cycle corresponding to a varying cycle of said tracking error signal;
(f) means for generating a reference pulse signal having a cycle corresponding to a period while same moving means moves said medium to said predetermined pitch at said predetermined speed;
(g) counting means for counting pulses of said reference pulse signal for a period of time corresponding to a phase difference between said first and second cyclic signals; and
(h) control means for controlling said moving means on the basis of the counted value of said counting means.

12. An apparatus according to claim 11, further comprising means for generating a movement pulse signal in response to the medium moving operation of said moving means.

13. An apparatus according to claim 12, wherein said counting means includes an up-down counter which up-counts the pulses of said reference pulse signal and down-counts the pulses of said movement pulse signal.

14. An apparatus according to claim 13, wherein said control means includes stopping means for stopping means for stopping the movement of said record bearing medium caused by said moving means, said stopping means operating on the basis of the counted value of said up-down counter.

15. An apparatus according to claim 12, wherein said counting means is arranged to count the pulses of said movement pulse signal with the exception of said period of time corresponding to said phase difference.

16. An apparatus according to claim 15, wherein said control means includes detecting means for detecting that the counted value of said counting means has reached a predetermined value; and stopping means for bringing to a stop the movement of the medium caused by said moving means, said stopping means operating according to the output of said detecting means.

17. An apparatus according to claim 16, wherein said predetermined value is determined according to the number of pulses of said movement pulse signal generated when said medium is moved to an extent corresponding to said predetermined pitch.

18. An information signal reproducing apparatus for reproducing signals from a tape-shaped record bearing medium, on which many helical tracks are formed at a predetermined pitch, comprising:
(a) a rotary head arranged to trace said tape-shaped record bearing medium;
(b) means for generating a first cyclic signal having a cycle corresponding to the period of rotation of said rotary head;
(c) means for generating a tracking error signal which indicates the tracking error of said rotary head relative to one of said many tracks;
(d) means for generating a second cyclic signal having a cycle corresponding to varying cycles of said signal;
(e) moving means for moving said tape-shaped record bearing medium;
(f) pulse signal generating means for generating a pulse signal in response to the medium moving operation of said moving means;
(g) detecting means for detecting that the pulses of said pulse signal have been produced in number corresponding to a phase difference between said first and second periodic signals; and
(h) control means for controlling said moving means on the basis of the output of said detecting means.

19. An apparatus according to claim 18, wherein said control means is arranged to allow, at a timing according to said first periodic signal, said moving means to start moving said record bearing medium and to cause, on the basis of the output of said detecting means, the moving means to stop moving said medium.

20. An information signal reproducing apparatus for reproducing signals from a tape-shaped record bearing medium, on which many helical tracks are formed at a predetermined pitch, comprising;
(a) a rotary head arranged to trace said tape-shaped record bearing medium;
(b) means for generating a first cyclic signal having a cycle corresponding to the period of rotation of said rotary head;
(c) means for generating a tracking error signal which indicates the tracking error of said rotary head relative to one of said many tracks;
(d) means for generating a second cyclic signal having a cycle corresponding to a varying cycle of said tracking error signal;
(e) moving means for moving said tape-shaped record bearing medium in longitudinal direction thereof at a predetermined speed;
(f) first pulse signal generating means for generating a first pulse signal having a frequency corresponding to the medium moving speed of said moving means in response to the medium moving operation of said moving means;
(g) second pulse signal generating means for generating a second pulse signal having a predetermined frequency as that of said first pulse signal obtained with said medium moved at said predetermined speed by said moving means;
(h) counting means for counting the pulses of said first and second pulse signals in response to said first and second cyclic signals; and
(h) control means for controlling said moving means on the basis of the output of said counting means.

* * * * *